US007928594B2

(12) United States Patent
Shreider et al.

(10) Patent No.: US 7,928,594 B2
(45) Date of Patent: Apr. 19, 2011

(54) APPARATUS FOR RECEIVING AND TRANSFERRING KINETIC ENERGY FROM A FLOW AND WAVE

(76) Inventors: Vladimir Anatol Shreider, Sydney (AU); Natalia Shreider, Sydney (AU)

( * ) Notice: Subject to any disclaimer, the term of this patent is extended or adjusted under 35 U.S.C. 154(b) by 269 days.

(21) Appl. No.: 12/001,943

(22) Filed: Dec. 14, 2007

(65) Prior Publication Data
US 2009/0152870 A1    Jun. 18, 2009

(51) Int. Cl.
F03B 13/00    (2006.01)
H02P 9/04     (2006.01)
F03B 13/10    (2006.01)

(52) U.S. Cl. ............... 290/54; 290/43; 290/44; 290/55; 60/398; 415/2.1; 415/4.1; 415/905; 415/907; 416/7; 416/111; 416/119; 416/132 B

(58) Field of Classification Search .............. 290/43, 290/44, 54, 55; 60/398; 415/2.1, 4.1, 4.2, 415/4.3, 4.5, 905, 907; 416/7, 111, 119, 416/132 B
See application file for complete search history.

(56) References Cited

U.S. PATENT DOCUMENTS

| | | | | |
|---|---|---|---|---|
| 981,077 | A | * | 1/1911 | Feldner ................ 415/210.1 |
| 2,017,961 | A | * | 10/1935 | Ferral .................... 415/4.5 |
| 2,517,135 | A | * | 8/1950 | Rudisill ................ 290/44 |
| 2,650,752 | A | * | 9/1953 | Hoadley ................ 415/194 |
| 3,339,078 | A | * | 8/1967 | Crompton .............. 290/44 |
| 3,350,938 | A | * | 11/1967 | Rittenhouse et al. ...... 73/861.92 |
| 3,355,947 | A | * | 12/1967 | Karlby et al. ............. 73/861.84 |
| 3,798,968 | A | * | 3/1974 | Harris .................... 73/861.92 |
| 3,883,750 | A | * | 5/1975 | Uzzell, Jr. .............. 290/55 |
| 3,948,099 | A | * | 4/1976 | Geisow .................. 73/861.92 |
| 3,986,787 | A | * | 10/1976 | Mouton et al. ........... 415/7 |
| 4,021,135 | A | * | 5/1977 | Pedersen et al. ........ 415/208.2 |
| 4,075,500 | A | * | 2/1978 | Oman et al. ............. 290/55 |
| 4,086,498 | A | * | 4/1978 | Szoeke .................. 290/55 |
| 4,087,196 | A | * | 5/1978 | Kronmiller .............. 415/4.5 |
| 4,132,499 | A | * | 1/1979 | Igra ..................... 415/210.1 |
| 4,140,433 | A | * | 2/1979 | Eckel ................... 415/209.1 |
| 4,143,992 | A | * | 3/1979 | Crook .................. 415/220 |
| 4,163,904 | A | * | 8/1979 | Skendrovic ............. 290/54 |
| 4,204,799 | A | * | 5/1980 | de Geus ................. 415/4.5 |
| 4,218,175 | A | * | 8/1980 | Carpenter .............. 415/219.1 |
| 4,288,704 | A | * | 9/1981 | Bosard .................. 290/55 |
| 4,309,146 | A | * | 1/1982 | Hein et al. ............. 415/4.4 |
| 4,324,985 | A | * | 4/1982 | Oman .................... 290/55 |
| 4,345,801 | A | * | 8/1982 | Randolph et al. ........ 384/300 |
| 4,352,989 | A | * | 10/1982 | Gutierrez Atencio ...... 290/53 |
| 4,411,588 | A | * | 10/1983 | Currah, Jr. ............. 415/220 |
| 4,422,820 | A | * | 12/1983 | Kirsch et al. ........... 415/4.3 |
| 4,482,290 | A | * | 11/1984 | Foreman et al. ......... 415/207 |
| 4,613,279 | A | * | 9/1986 | Corren et al. .......... 415/121.2 |

(Continued)

Primary Examiner — Pedro J Cuevas

(57) ABSTRACT

A tandem axial turbine that comprises a front confusor, a funnel-shaped runner having inner blades and capable of accelerating and directing an oncoming flow toward a co-axial rear runner which rotates in an opposite direction. A tangential turbine has a hub, blades capable of rotating in relation to the hub between positions across and along the flow, and propulsion springs for controlling the movement of the blades in relation to the hub and the transfer of the energy. A second tangential turbine comprises a runner having a hub and blades and a shroud capturing the runner from above and around and permitting the blades to dip into water flowing immediately below the hub and an opening of the shroud. A surface vessel comprises a stabilized frame rotatably affixed on a vessel hull about a center of wave induced rocking motions of the vessel and therefore isolated from a rocking motion of the vessel.

6 Claims, 5 Drawing Sheets

U.S. PATENT DOCUMENTS

| | | | | |
|---|---|---|---|---|
| 4,720,640 | A * | 1/1988 | Anderson et al. | 290/43 |
| 4,822,247 | A * | 4/1989 | Heinz | 416/189 |
| 4,868,408 | A * | 9/1989 | Hesh | 290/52 |
| 4,936,750 | A * | 6/1990 | Heinz | 416/196 A |
| 5,457,346 | A * | 10/1995 | Blumberg et al. | 290/55 |
| 5,599,172 | A * | 2/1997 | McCabe | 417/334 |
| 6,126,385 | A * | 10/2000 | Lamont | 415/4.5 |
| 6,132,172 | A * | 10/2000 | Li | 416/11 |
| 6,246,126 | B1 * | 6/2001 | Van Der Veken et al. | 290/55 |
| 6,806,586 | B2 * | 10/2004 | Wobben | 290/54 |
| 6,849,965 | B2 * | 2/2005 | Le Nabour et al. | 290/55 |
| 6,887,031 | B1 * | 5/2005 | Tocher | 415/1 |
| 6,952,058 | B2 * | 10/2005 | McCoin | 290/44 |
| 7,094,018 | B2 * | 8/2006 | Grubb | 415/4.3 |
| 7,098,552 | B2 * | 8/2006 | McCoin | 290/44 |
| 7,102,249 | B2 * | 9/2006 | Wobben | 290/54 |
| 7,116,006 | B2 * | 10/2006 | McCoin | 290/54 |
| 7,214,029 | B2 * | 5/2007 | Richter | 415/4.5 |
| 7,218,011 | B2 * | 5/2007 | Hiel et al. | 290/43 |
| 7,220,096 | B2 * | 5/2007 | Tocher | 415/1 |
| 7,255,527 | B2 * | 8/2007 | Hsu | 415/4.3 |
| 7,372,172 | B2 * | 5/2008 | Winkler et al. | 290/43 |
| 7,400,057 | B2 * | 7/2008 | Sureshan | 290/55 |
| 7,471,009 | B2 * | 12/2008 | Davis et al. | 290/54 |
| 7,484,363 | B2 * | 2/2009 | Reidy et al. | 60/398 |
| 7,612,735 | B2 * | 11/2009 | Essig et al. | 343/915 |
| D608,736 | S * | 1/2010 | Brock | D13/115 |
| 7,682,127 | B2 * | 3/2010 | Paul | 415/4.2 |
| 7,713,020 | B2 * | 5/2010 | Davidson et al. | 415/1 |
| 7,726,934 | B2 * | 6/2010 | Cowan | 415/4.2 |
| 7,726,935 | B2 * | 6/2010 | Johnson | 415/4.3 |
| 7,728,454 | B1 * | 6/2010 | Anderson, Jr. | 290/54 |
| 7,744,339 | B2 * | 6/2010 | Flores Lumbreras | 415/4.2 |
| 2004/0042894 | A1 * | 3/2004 | Smith | 415/4.3 |
| 2006/0033674 | A1 * | 2/2006 | Essig et al. | 343/912 |
| 2008/0023964 | A1 * | 1/2008 | Sureshan | 290/55 |
| 2008/0061559 | A1 * | 3/2008 | Hirshberg | 290/55 |
| 2008/0265583 | A1 * | 10/2008 | Thompson | 290/54 |
| 2009/0263244 | A1 * | 10/2009 | Presz et al. | 416/1 |
| 2009/0317231 | A1 * | 12/2009 | Presz et al. | 415/4.3 |
| 2010/0066089 | A1 * | 3/2010 | Best et al. | 290/52 |
| 2010/0068029 | A1 * | 3/2010 | Presz et al. | 415/1 |
| 2010/0080683 | A1 * | 4/2010 | Presz et al. | 415/4.3 |
| 2010/0084862 | A1 * | 4/2010 | Unno | 290/43 |
| 2010/0086393 | A1 * | 4/2010 | Presz et al. | 415/1 |
| 2010/0090474 | A1 * | 4/2010 | Anguelo | 290/55 |
| 2010/0092290 | A1 * | 4/2010 | Aaron | 416/9 |
| 2010/0111668 | A1 * | 5/2010 | Kapich | 415/47 |
| 2010/0119361 | A1 * | 5/2010 | Presz et al. | 415/191 |
| 2010/0140942 | A1 * | 6/2010 | Pitre | 290/50 |
| 2010/0148512 | A1 * | 6/2010 | Pitre | 290/54 |
| 2010/0148513 | A1 * | 6/2010 | Susman et al. | 290/54 |
| 2010/0162685 | A1 * | 7/2010 | Hirshberg | 60/266 |

* cited by examiner

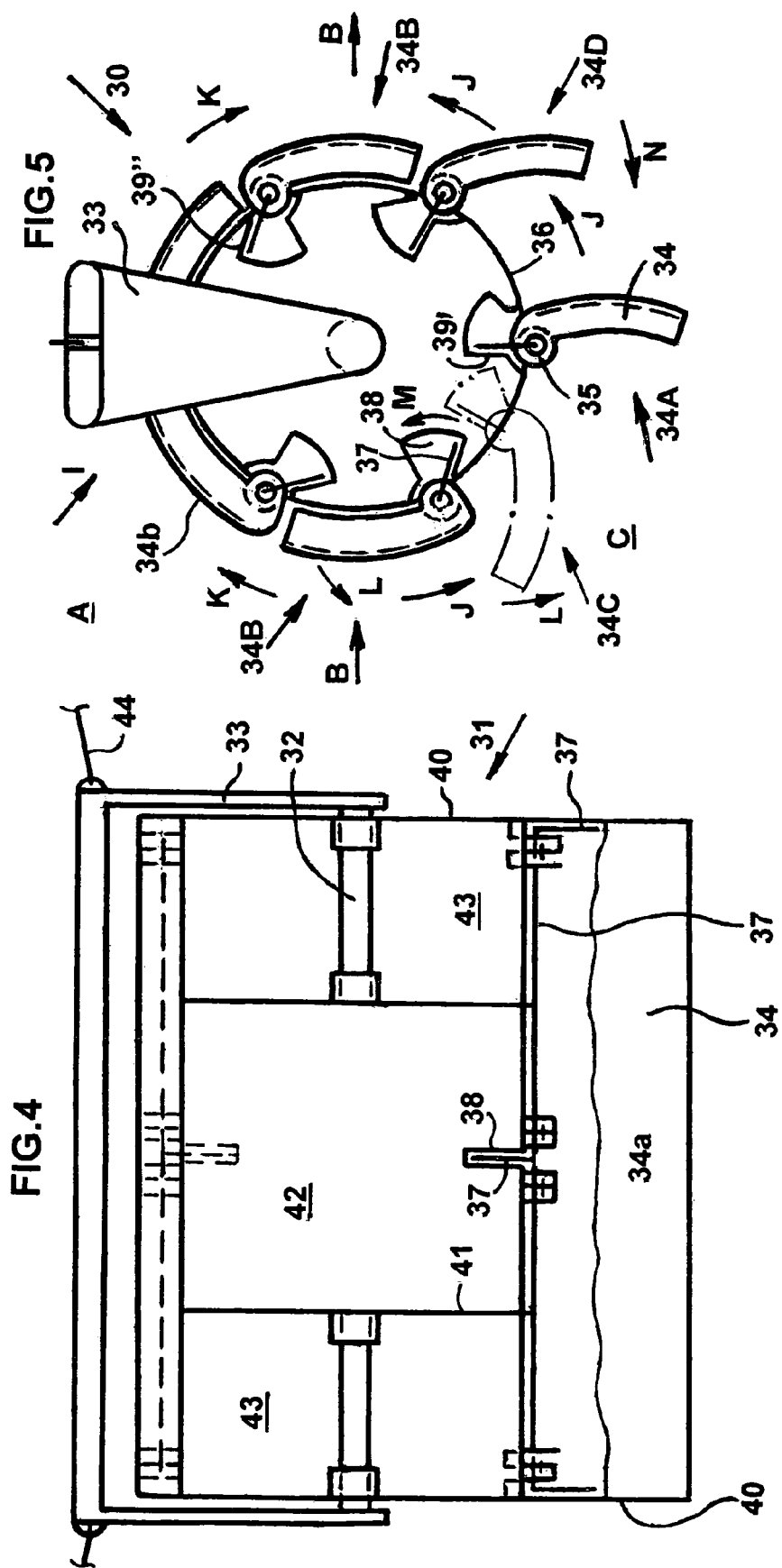

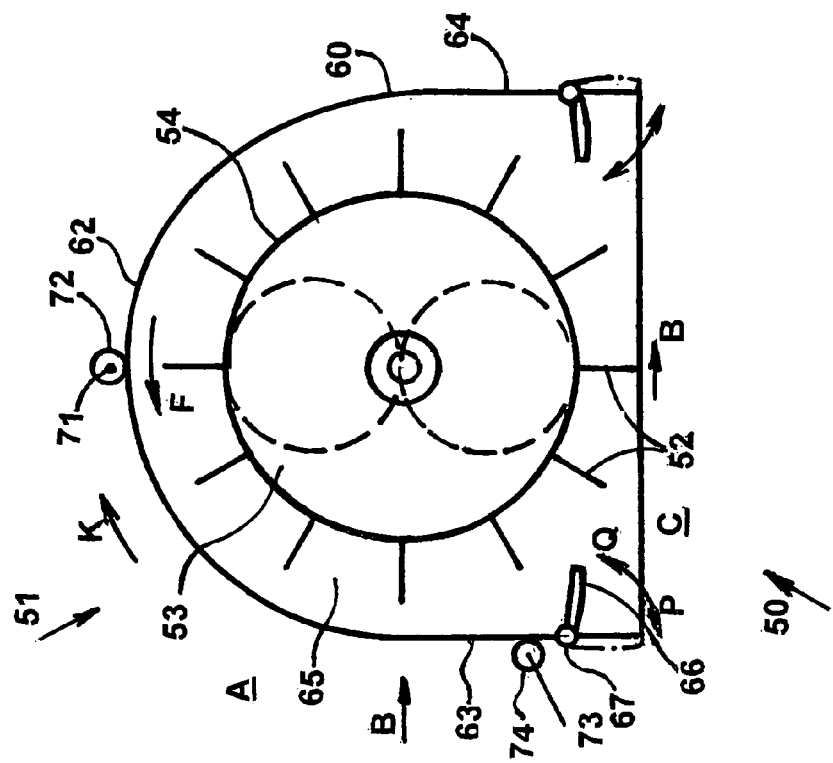
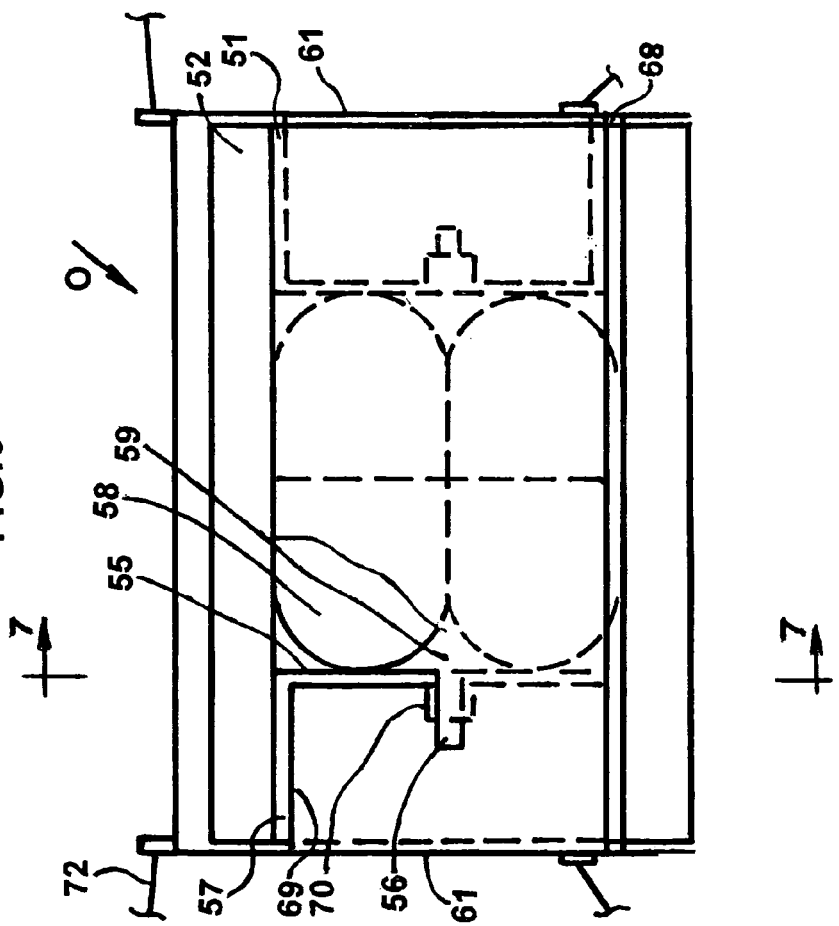

APPARATUS FOR RECEIVING AND TRANSFERRING KINETIC ENERGY FROM A FLOW AND WAVE

CROSS-REFERENCE TO RELATED APPLICATIONS

Not Applicable

STATEMENT REGARDING FEDERAL SPONSORED R and D

Not Applicable

REFERENCE TO A MICROFICHE APPENDIX

Not applicable

BACKGROUND OF THE INVENTION

The invention relates to apparatuses for receiving and transferring kinetic energy of a fluid basin, especially a water basin into any useable power and to submersible axial fluid turbines as defined in claim 1.

There exists a need for effective, high-speed hydro-turbine units which do not require substantial vehicular support for deployment or retrieval and can be placed in a particular optimal operative position in a path of water flow, then easily maneuvered to a different position within the water flow in the event of a change of location of the optimal path and stabilized in the path without complex anchoring means.

For claim 1 here are considered as the nearest to the invention:

a dual turbine unit suggested with E.U. Patent Application PCT WO No. 02/27151 A1 and counteracts rotational counter-torque of side-by-side disposed fluid turbines, but has the disadvantage such as a heavy shroud capturing the turbines; and a conical turbine body described with Australian Patent Application No. 587780 filed of May 11, 1985 which increasing in radial dimension and having a plurality of blades spaced outside and around the body and providing channels diverging tangentially from axial planes, but having the disadvantages such as a rotational counter-torque, relative small speed of rotation, needing of a rotatory motionless support.

For claims 5 and 6 here is considered as the nearest a tangential turbine from E.U. Patent Application PCT No. WO 9961791 filed Dec. 2, 1999 that is provided with blades rotatable by the flow through 180° between positions across and along the flow and has the disadvantage such as needing of a damping means for absorbing shock energy of the blades.

For conversion of the energy of the rocking motion into any useable power it is is needed a supporting mechanical component such as a sea bottom but which may be remote and therefore must be substituted. Here are considered as the nearest:

a known from U.S. Pat. No. 6,561,856 of May 13, 2003 wave-powered ship propulsion system comprising a gyroscopically stabilized platform carried by a ship and isolated from a pitching motion of the ship; the disadvantages of this technology are relative short distance of a moment of force and therefore needing a large size gyroscope, and to control a gyro precession;

and following systems servicing for damping a rocking motion of ships that is important for the safety, comfort and efficiency of loading and unloading of a cargo of the ships:

forward and astern located, rocking-suppressing stabilizers from U.S. Pat. No. 4,266,496 issued May 12, 1981 that are carried beneath the vessel and have horizontal surface areas disposed tangentially in relation to an axis of rocking. The disadvantage is that the stabilizers are not capable of stabilizing a rolling motion of the ship.

The invention is intended to eliminate the prior art inconveniences and is directed to new and useful developments and alternatives to the prior art.

SUMMARY OF THE INVENTION

A first embodiment of the apparatus according to the present invention for receiving and transferring kinetic energy of a fluid flow follows the general idea of utilizing a tandem axial turbine unit comprising co-axially disposed a rotatable front axial turbine runner of relatively big diameter and a rotatable rear axial turbine runner of relatively small diameter, where the front runner is capable of directing and speeding an oncoming part of the main flow toward the rear runner and comprises a plurality of blades for receiving the oncoming fluid flow energy, a funnel-shaped member supporting and guiding the blades and capable of urging the oncoming flow in axial and converging radial and tangential directions, and forming a relatively low pressure zone in the outer main flow immediately adjacent to and downstream of the unit for further accelerating the oncoming flow in relation to the blades of the front and rear runners which rotate in opposite directions, where the confusor portion has the cone angle equal to about 30° to 40° and each of the front blades is extending along a line diverging at an angle which increasing in the axial direction from about 30° to 45°, and having the radial dimension that being equal to about 25-30% of an inner diameter of the confusor portion. A co-axially disposed, water-cleaning curtain lattice is fixedly mounted with its outer rear edge to and between and ahead of the front edge of the funnel for retention of weeds and debris's carried by the oncoming fluid flow, and an elongate, lattice-cleaning scraper is co-axially disposed immediately ahead of the lattice and supported rotatably about the axis on the pin and extending toward the edge and having the center of gravity being located under of the axis and a cutting edge oriented in a direction opposite the direction of rotation of the lattice thereby the scraper can remove debris's delayed by the lattice member; and an axially disposed pin supporting the front and rear runners for relative rotation and having a front end; and a means for connecting the front pin end to stopper objects, where the main flow is moving relative to the stopper objects, capable of maintaining the unit in operative positions in the main flow.

The axial turbine unit further comprises a means for conversing the kinetic energy of the front and rear runners into electricity, that comprising an electricity generator having first generator part connected to the funnel and second generator part connected to the hub for relative rotation by the fluid flow to effect generating of electricity, a shaft connecting the funnel to the corresponding generator part, a shaft connecting the hub to the other generator part, a means for increasing speeds of rotation of the parts, conduits for transferring electricity from the parts toward an user;

where the speed increasing means comprises a vertically disposed, spider-shaped frame for supporting the unit, the frame having a plurality of radially extending consoles and openings therebetween, where the horizontal consoles are connected to the stopper is objects; backward oriented, gear and support wheels of a relatively small diameter supported rotatably on ends of the consoles; a frontally and co-axially disposed, circular supporting and guiding rail- and driving gear wheel-shaped portion of a relatively big diameter of the funnel, where the rail and gear portion being engaged with the support and gear wheels; a number of radially extending shafts supporting the wheels and being supported rotatably on the consoles; the number of gear wheels of relatively big diameter supported on inner ends of the radial shafts and engaged with a gear wheel of a relatively small diameter that is supported on the shaft of the corresponding generator part.

A second embodiment of the apparatus according to the invention comprises two preferred embodiments of a tangential fluid turbine unit. The general idea of the claimed invention of the first unit is the utilizing a turbine runner comprising turbine blades turnable about a generally horizontal axis, the axis being parallel to an axis of rotation of the runner and within a runner hub and an adjacent to the hub inner edge of the blade, and movable between a lowermost position across a lower ambient, in relation to the runner, fluid flow and an uppermost position along a counter upper ambient fluid, where the hub is provided with a shaft rotatable in one direction about the axis of rotation of the runner, the axis being crossing a direction of the main flow, and supported from a turbine shroud.

The hub comprises holds for accommodation of energy-generating parts which may be connected individually to the shaft and to the shroud, and closed tanks for controlling buoyancy and balance of the unit in the main water flow that are adapted to be filled up with ballast sand mixed with a thixotropic material, and provided with an energized vibrator means.

The runner comprises pivoting springs capable to individually control the position of each blade within a certain range of the pivotal positions and adapted for transferring the kinetic energy from the lower ambient flow as the blade pivots from the lower to the upper position and pivoting the blade vice versa, each of the springs is integrally connected with its ends to the blade and to the hub to effect pivoting of the blade between stops, and is capable of forcing the hub against the blade and the lower ambient flow to effect the transferring of the energy, and a pair of the stops permit pivotal movement of the spring with the blade relative to the hub between the upper and lower positions.

The general idea of the second unit is the utilization of a turbine shroud capturing watertightly a turbine runner from above and outside, and having a roof, a front wall for facing the oncoming water flow and having a lower edge for forming a speeded fluid jet under the front wall in a direction toward a lowermost blade of the runner, a rear wall having a lower edge proximate to a point of the jet discharge from the unit, opposite side walls having lower edges located on a horizontal plane containing a lower edge of a lowermost blade of the runner, which upper portion being on a horizontal plane containing the lower edges of the front and rear walls; where the roof and the front, side and rear walls define an opening from below interior room for accommodating the runner; runner shell walls and inner partition walls define runner end compartments for accommodating shafts and a means for conversion of kinetic energy of the runner into any useful energy, where the conversion means may be coupled to the shafts and to the shroud therebetween; thereby the lower position of the blades is located below the room and the upper position of the blades is located within the room. The apparatus further comprises a source of compressed air, pipes and controlling valves for connecting the air source and the room that being functional to displace the air into and out of the room, whereby a lower surface of air body within the room and lower portions of the side walls located below the hub that define a channel for the jet to rotate the shafts with the blades and thereby capable of keeping relatively bigger kinetic energy of the jet;

a front, shroud interior room-forming apron having first and second opposing ends in a close facing relationship to respective inside faces of the side walls and an forward and upward oriented side edge extending between the side walls and being supported pivotally at the upper edge in a close facing relationship on the lower edge of the front wall and capable of floating on the water surface and pivoting about an axis within the lower and upper front edges and parallel to the axis of the runner between a backward oriented horizontal position and a downward oriented position; a rear, shroud interior room-forming apron having first and second opposing ends in a close facing relationship to respective inside faces of the side walls and a rearward and upward oriented side edge extending between the side walls and being supported pivotally at the upper edge in a close facing relationship on the lower edge of the rear wall and capable of floating on the water surface and pivoting about an axis within the lower and upper rear edges and parallel to the axis of the runner between a forward oriented horizontal position and a downward oriented position; a sealing packing means located outside on the ends of the aprons for engaging on the inside faces of the side walls to close-off the interior of the room in relation to its exterior and prevent the outflow of air from the room into outside; whereby movement of the air into and out of the room displaces the surface of the water located in the room in a corresponding vertical direction within a radial width of a lowermost blade of the runner and pivots the aprons follow the water surface about their pivot axes, and thereby changes a depth of sinking of the blades into the jet and a magnitude of the kinetic energy which being received by the blades from the jet.

In another aspect the present invention provides a method of water flow-creating useable energy by transforming a water flow induced rotation of the second tangential fluid turbine runner into an amplified motion of a energy-generating member of an useable energy generator, the method comprising the steps of utilizing the second embodiment of the tangential water turbine unit, and operating an activating means of the source of compressed air to displace air in an intended sense in relation to the interior of the shroud room and to displace a surface of the water in an intended vertical direction within a radial width of a lowermost blade of the runner to cause the water to flow between the apron with the sealing means engaging the side walls and press on an intended surface of the lowermost blade.

A third embodiment of the apparatus according to the invention provides a water wave kinetic energy-receiving and transferring system for transforming and damping and restraint a wave induced rolling motion of a surface vessel. The general idea of the claimed invention is utilization of the rocking process through interacting with a stabilized frame which being isolated from the rocking motion and motionless owing to being supported from a vessel hull for a rotation about an axis which being matched with a determined axis of the rocking motion and further stabilized by means of its gravity and adjacent motionless water.

The hull comprises a number of facilities for containing a ballast sand of an intended constant mass and a ballast water, the ballast water being spreaded within a volume of the sand and capable of being changed in its mass and a position of a center of mass;

an energized bilge pumping equipment for effecting a change of the mass and the position of the center of mass, and a means for measuring frequencies of the rocking, pitching and rolling motions of the ballasted vessel and determining when to operate an activating means of the bilge pumping equipment to effect tuning of the system into resonance of the rocking motions to effect increasing of the induced generation of the intended energy and into a dissonance of the rocking motions to effect increasing of the restraint of the motions.

The hull of the vessel adapted to generate an energy that comprises boards and a bottom having a circular outer surface. The vessel comprises a frictionless bearing means supporting the frame means remote from the central point. The hull has a upward oriented circular, in relation to the central point, surface area, the frame means has a downward oriented, co-pointed surface area, and the bearing means comprises a movable co-pointed bearing retainer member extending between the surfaces, and a plurality of bearing balls connected movably to the retainer member.

The stabilized frame means is adapted to extend down toward below a water line of the hull and has a vertical surface area with its center of dynamic pressure upon adjacent water that located remote from the central point.

The system comprises a number of first rocking motion-restraint and energy-transferring members, each of the first members is supported at its end from the stabilized frame means in a depending relationship and remote from the point, a number of second rocking motion-restraint and energy-transferring members, each of the second members is supported at its end from the hull remote from the point and capable of being forced into interaction with a corresponding first member, wherein a rocking, pitching and rolling motion of the vessel produces a relative movement between the supported ends of the interacting first member and second member, which movement causes a relative movement between the interacting first member and second member to produce an amplified oscillating motion of the second member to provide intended restraint of the rocking motion about the point and generation of the energy. Each of the number of the first members is rotatably supported for rotation about a first point, and each of the second number of the second members is rotatably supported for rotation about a second point, the first point and the second point being remote from the central point.

The system comprises a number of reversible machines, each of the machines is connected to the first member and to the second member therebetween and capable of generating an intended useable energy and restraint the relative movement between the ends of the first and second members. The machine is a cylinder and sliding vane motor-pump assembly comprising a circular cylindrical shaft member having first and second opposing end pin portions and at least one pumping and damping vane portion extending radially, in relation to an axis of the shaft member, between the first and second pin portions, where each of the vane portions has a first end and a second end and an outer edge extending between the first and second edges toward immediately an inner face of a pumping and damping cylinder member of the assembly, the co-axially disposed pumping and damping cylinder member having two opposing, radially extending end walls that being provided with axial openings generally surrounding the pin portions of the shaft member and a circular cylindrical wall extending between the end walls and having vane portions extending between end walls radially inward and toward immediately an outer face of the shaft member, a sealing means at the openings and edges of the vane portions of the shaft and cylinder members for engaging on the faces of the cylinder and shaft members to relatively close off interiors between the vane portions of the cylinder and shaft members and prevent the outflow of the fluid materials being compressed from the interiors being reduced into the adjacent interiors being extended; a valves and pipes for sucking the fluid materials into the interior being extended and exhausting the compressed fluid materials from the interior being reduced toward a reserve tank receiving and storing the compressed fluid materials, where the valves are capable of tuning the generating-pumping system or shutting it down; the tank provided with valves and pipes for transferring the compressed fluid materials toward an user, where the valves are capable of changing pressure of the stored fluid materials for tuning the generating-pumping system or shutting it down.

The invention may be understood more readily and various other features of the invention may become more apparent from consideration of the following description.

BRIEF DESCRIPTION OF THE DRAWINGS

FIG. 4 is a front view of a first embodiment of a kinetic fluid flow energy-receiving and transferring tangential fluid turbine unit of the apparatus according to the invention;

FIG. 5 is a side view of the tangential fluid turbine unit shown in FIG. 4;

FIG. 6 is a front view of a second embodiment of a kinetic fluid flow energy-receiving and transferring tangential fluid turbine unit of the apparatus according to the invention;

FIG. 7 is a side view of the tangential fluid turbine unit shown in FIG. 6;

DESCRIPTION OF THE PREFERRED EMBODIMENTS

Figure 1:
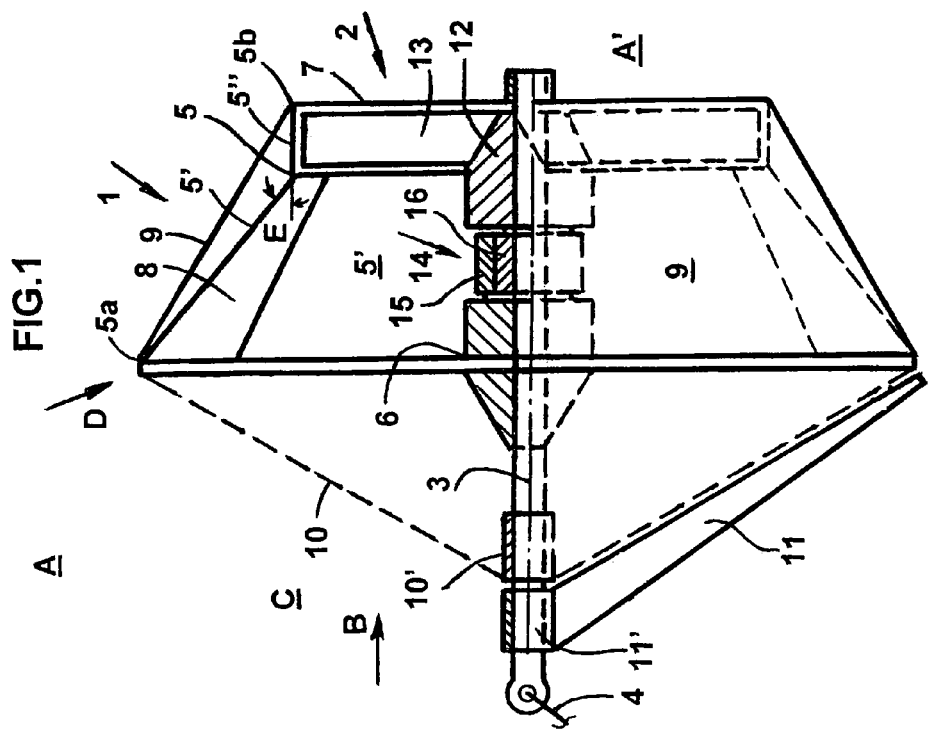
FIG. 1 is a side view of a first embodiment of a kinetic fluid flow energy-receiving and transferring unit of the apparatus in accordance with the invention as it is seen when is being maintained within a path of a water flow upon upstream located tethers.

Referring to the drawings, reference letter A denotes a fluid, preferably water, body moving in relation to a ground floor in a main direction shown by an arrow B in FIG. 1, letter C denotes an oncoming part of the flow A which having conditions sufficient for receiving its kinetic energy by means of an embodiment of the apparatus according to the invention.

The first embodiment of the apparatus according to the invention includes a tandem axial fluid turbine unit B as illustrated in FIG. 1, adapted to submerge and capable of being maintained in a path of, the main flow A and comprising a relatively widened, rotatable front axial turbine runner assembly 1 capable of facing, directing and speeding an oncoming fluid flow C; a relatively narrowed, rotatable rear co-axial turbine runner assembly 2; an axially and horizontally disposed, elongate pin member 3 supporting the assemblies 1 and 2 for relative rotation about a central longitudinal axis of the assemblies 1 and 2 and the member 3, the axis being oriented in the direction B, an elongate tether member 4 of a means supporting the unit D in operative positions within the path of the water flow A and described more fully hereinafter, connected with its rear end to the front end of the member 3 provided with a well-known swivel.

The assembly 1 comprises a funnel-shaped member 5 disposed along the direction B and having a front edge 5a and a co-axially disposed, confusor wall portion 5' extending from the edge 5a along the axis for facing the flow C and a circular ring-shaped nozzle wall portion 5" having an end edge 5b disposed in a plane perpendicular to the axis and proximate to a point of water discharge from the unit D; a front spider-shaped hub member 6 fixedly connected to the edge 5a, a rear spider-shaped hub member 7 fixedly connected to the edge 5b; a set of 6 to 20, preferably 15 elongate, radially disposed and spaced blade members 8 for receiving kinetic energy of the flow C, the members 8 are fixedly mounted from inside to the portion 5'; a rear wall 9 located and connected fixedly around and from behind to the member 5 for forming a hollow and closed buoy which is configured to keep the unit D in a floating working position in the water flow A; a frontally and co-axially disposed, conical preferably shaped, rotatable, retention grid or lattice member 10 for stopping weeds and debris's carried by the fluid to clean the flow C, the member 10 having a conical portion for facing the flow C and provided with holes of an intended size, 100-250 mm for instance, and fixedly connected at its outer end edge to and ahead of and between the edge 5a and to a hub portion $10_1$ which being supported by the member 3 for rotation; an elongate, weeds and debris's-removing scraper or knife member 11 for cleaning the member 10, located immediately ahead of the member 10 and extending radially from the member 3 along the cone generatrix of the member 10 to the outer end and rotatably supported by means of the member 3 for rotation and having the center of gravity located remotely from the axis and a cutting edge oriented in a direction opposite to a direction of rotation of the member 10.

The portion 5' has the base cone angle E of approximately 30-45°, preferably 35° in relation to the axis and capable of being forced into interaction with the flow C to urge the flow C in converging radial direction, in relation to the axis, for speeding the flow C within the unit D in the direction B and operable by a dynamic pressure of the flow C. Each member 8 extends from its leading end and diverging from the direction B at an angle progressively increased from about 30° relative to a central axial plane of the portion 5' to 45° at its end. The portion 5' and adjacent respective members 8 define directing channels extending along and between the respective members 8 in converging screw directions shown by an arrow F in FIG. 2 about and along the axis and diverging from the direction B, so that when the oncoming fluid C flows within the assembly 1 and moves across the members 8 the assembly 5 rotates about the axis in a direction shown by an arrow G in FIG. 2, and forms an accelerated and converged screw fluid flow within the member 5 about and along the axis in the directions B and F, thereby serves as an jet nozzle in relation to the assembly 2.

When water C flows axially into the assembly 1, weeds and debris's carried by the flow C that are stopped by the member 10 and shredded and removed by the member 11 rotating by means of its own weight about the member 3 in relation to the member 10. A low pressure zone A' being created in the flow A immediately behind the assembly 1 because its abrupt ending, i.e. the large wall 9 so that the water continues to accelerate within the portion 5" as the water is sucked into the zone A'.

The assembly 2 comprises a rotatable hub member 12 and a plurality of radially disposed, spaced blade members 13 fixedly mounted on the member 12 and oriented at angle 30-45° relative to the axis for being transversal to the screw flow from the assembly 1. There are provided channels between adjacent respective members 13 diverging from the direction B in a second intended direction opposite to the direction F, so that when water flows from the assembly 1 axially in the direction B and tangentially in the direction F into the assembly 2 toward its rear end, the assembly 2 rotates in a direction opposite the direction G and compensates a counter-torque being generated by the assembly 1.

Figure 2:
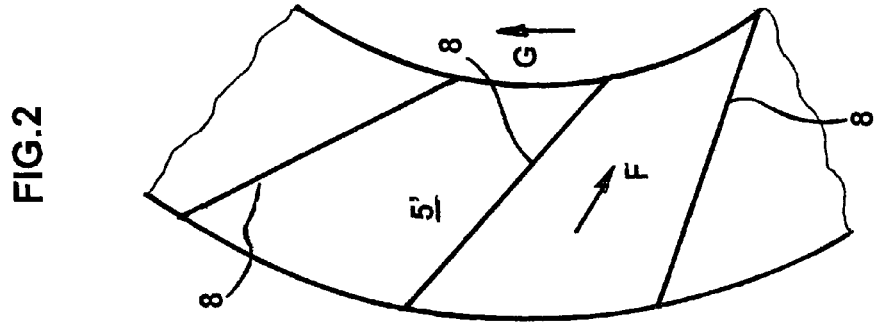
FIG. 2 is a constructional diagram for the confusor portion and blades of the front turbine runner assembly shown in FIG. 1.

Exact number of the members 8 and 13, their shape and configuration and the proportions relative to the member 5 and the member 7 may be varied, but the arrangement described with reference to FIGS. 1 and 2 is considered to provide a highly efficient tandem axial fluid turbine particularly suitable for use in relatively low velocity fluid streams. The shape of the members 5 and 8 allow typical speeds of rotation which are greatly in excess of that expected from a conventional waterwheel which is limited to stream speed. This is though to result from a Venturi effect of the members 8 and 13: the water velocity is increased as it passes along the member 5 and is sucked into the low pressure zone immediately behind the members 13 and therefore impinges with more dynamic pressure upon the members 8 and 13 to accelerate the rotation of the assemblies 1 and 2. Central portions of the members 6 and 7 may be hollow and can accommodate a well-known speed increasers (not shown) and a means for conversing the kinetic energy into any useable energy which are described more fully hereinafter, for example, a modular energy generator 14 composed of a generator "stator" part 15 which is connected with a shaft to the member 6 and a generator "rotor" part 16 which is connected by a shaft to the member 12.

The unit D is being maintained in the flow A by the member 4 connected to a is supporting means which is described more fully hereinafter.

Figure 3:
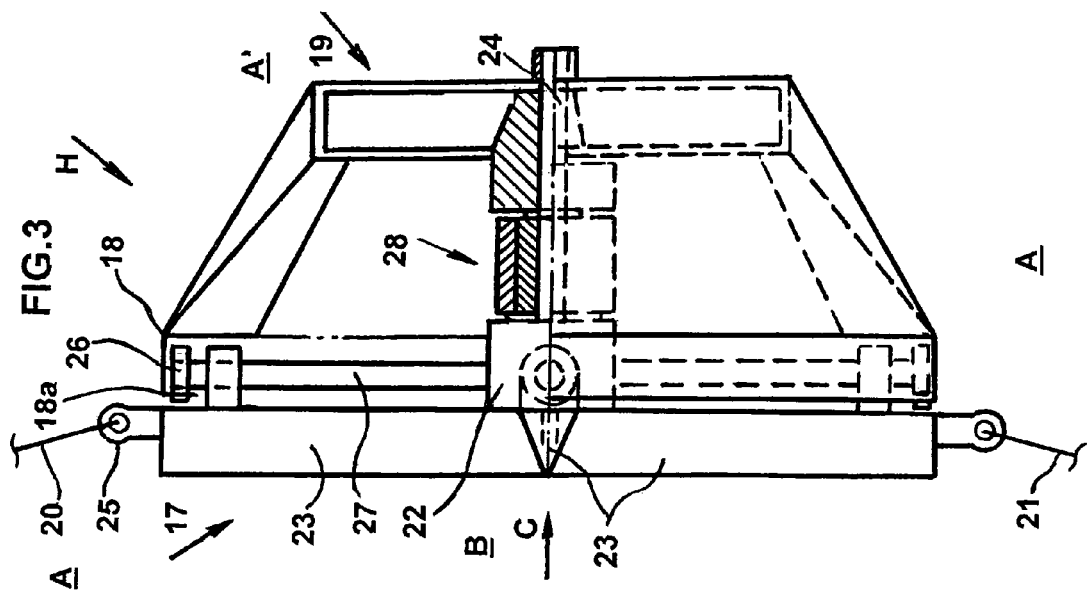
FIG. 3 is a side view of a second embodiment of a kinetic fluid flow energy-receiving and transferring, axial tandem fluid turbine unit of the apparatus in accordance with the invention as it is seen when being maintained within a path of a water flow upon two horizontally disposed tethers.

A second embodiment of the invention is a tandem axial fluid turbine unit H as illustrated in FIG. 3, comprises a vertically disposed, spider-shaped frame 17 for supporting components of the unit H, a front axial fluid turbine runner assembly 18 and a rear axial fluid turbine runner assembly 19, where the assemblies 18 and 19 can be similar in construction to the assemblies 1 and 2 of the unit D, elongate first tether member 20 and second tether member 21 for maintaining the unit H within the path of the flow A in operative positions in relation to the stopper objects (described more fully hereinafter).

The frame 17 is composed of a central body 22, a plurality, preferably four of the same elongate consoles 23 extended radially from the body 22 horizontally leftward and rightward, and preferably vertically and configured openings therebetween; an axial axle 24 supporting and guiding the assemblies 18 and 19 for rotation, left and right means 25 provided on ends of the horizontal consoles 23 for connecting to ends of the members 20 and 21. The number of backward oriented, in the direction C, supporting and guiding pin rack sprocket wheels 26 are rotatably supported on ends of the consoles 23 by means of the number of shafts 27 extending radially toward the body 22 and supported rotatably on the consoles 23.

The assembly 18 comprises a front, vertically disposed co-axially in relation to the axis, pin rack and rail portion 18a facing the wheels 26 which are serving as a speed increaser gear, so that when water C flows in the direction B into the assembly 18, the assembly 18 rotates about the axis, the wheels 26 are to roll on the rail and be in mesh with the portion 18a and be driven by the assembly 18 to rotate the shafts 27 connected by a speed increaser to a shaft of a generating part of a well-known modular energy generator 28.

The unit H is being maintained in the flow A by the members 20 and 21 connected to a supporting means which and the generator are described more fully hereinafter and is operates similarly to the unit D.

A next embodiment of the invention is a tangential fluid turbine unit I as shown in FIGS. 4 and 5 that is adapted to submerge and being maintained in a path of the flow A preferably water flowing in the direction B in FIG. 5 for receiving and transferring a kinetic energy from the flow A and comprises a tangential flow turbine runner assembly 30 having a hub body 31 for supporting components of the assembly 30 that is capable to rotate about a generally horizontal central axis of opposite axle members 32 of a frame shroud 33 capturing the assembly 30, the axis being disposed in general crossing alignment with the path of the flow A, in a direction shown by an arrow J in FIG. 5; at least 3, preferably 6 axially extending, elongate, kinetic energy-receiving paddle or wing blade members 34 distributed around and individually and pivotally connected as at 35 by means of a plurality of bearing lugs and brackets or a piano pivot bearing hinge connections and the like and a pin member that formed on the body 31 remotely from the axis. The hinges 35 permit the members 34 to oscillate downward alternately inward and outward, in relation to the body 32 and about a generally horizontal pivot axis, the pivot axis being within the member 34 and coplanar with the axis of rotation of the assembly 31, from an operative projected position shown by an arrow 34A in FIG. 5 for facing an oncoming circular lower ambient fluid flow C which being diverged from the direction B toward under the body 31 and flows in a diverged direction shown by an arrow J into an inoperative closed position shown by an arrow 34B in FIG. 5. A back face 34b of the member 34 is configured to be streamlined when it is in the inoperative position 34B. The members 34 may be rectangular in shape and are provided with stiffening support ribs oriented perpendicular to the pivot axis and along the direction J in order to present strength, fairness and firmness. Each of the members 34 is heavier than water and has a center of gravity located generally remotely from the axis of the hinge 35.

In the position 34B an inner facial surface 34a of the member 34 being in a close facing relationship to an outer facial surface of a preferably circular cylindrical shell wall 36 of the body 31. The members 34 in their positions 34B can thus form with their outer circular cylindrical facial surfaces 34b a streamlined surface for guiding an oncoming upper ambient slip fluid flow which being diverged from the direction B toward over the assembly 30 and flows in a direction shown by an arrow K in FIG. 5 and reduce friction resistance of the assembly 30. In the position 34A each member 34 can face the lower flow C in the direction J and thereby acting to transfer the kinetic energy of the lower flow C to the assembly 30 and urge the assembly 30 to rotate with the members 34 about the axis of the members 32.

An energy-transferring spring means such as an elongate, axially extending torsion rod member 37 is fixedly connected between the body 31 and the member 34. The body 31 has the number of recessions 38 having limit stops 39' and 39" and capable of permitting pivotal oscillation of a middle portion of the member 37 with the member 34 about the axis of the hinge 35 between the position 34B and the position 34A. The member 37 is configured to permit the member 34 pivotally oscillating about the axis of the hinge 35 in the position 34A and between the positions 34A and 34B.

The body 31 has any appropriate equilateral polygon or circular cross-section about the axis of rotation, opposite end walls 40 and a number of inner walls 41 distributed axially and secured perpendicularly to the axis of rotation and forming a number of closed, co-axial preferably disposed ballast tanks 42 configured between the wall 36 and the adjacent walls 41 to control a buoyancy and a balance of the unit I in the water flow A and provided with inlet and outlet manifolds and valves (not shown).

The walls 36, 39 and 40 are configuring opposite compartments 43 for accommodating a well-known means for conversing kinetic energy of rotation of the assembly 30 into any useable energy. Conversing parts of the conversing means can be connected to the body 31 and the members 32 for relative movement and interacting to effect generation of the useable energy.

The unit I is secured at the shroud 33 to an elongate tether member 44 and to support objects which and the conversing means and operating of the unit I are described more fully hereinafter.

The assembly 30 faces the oncoming flow B by means of the members 34 which move down in turn ahead immediately of the body 31 when are disposed in the inoperative position 34B and exposed the dynamic pressure of the flow B, and separate the flow B into an upper ambient slipping flow in a direction shown by an arrow K in FIG. 5 and a lower ambient speeded jet flow C in a direction shown by an arrow J in FIG. 5. When the center of gravity of a regular front member 34 becomes behind and outside of the axis of the hinge 35, the front member 34 turns by means of its own weight together with member 37 about the hinge 35 outward, in relation to the axis of the assembly 30 and the hinge 35 in directions shown by arrows L in FIG. 5 toward a limit 39' into a first operative position shown by an arrow 34C in FIG. 5 where the blade 34 can face the flow C oncoming in the direction J and then further turns about the axis the hinge 35 by the dynamic pressure of the flow C in the direction J against the resistance of the member 37 into an end operative position shown by an arrow 34A in FIG. 5 and further urges the assembly 30 to rotate about the axis of rotation with this lowermost member 34.

In the end operative position 34A each the lowermost blade 34 has its front face 34a which being farthest away from the axis of rotation and defines the widest fluid reception compartment, and the fastest lower fluid ambient jet flow C can be received in this widest compartment and the maximal dynamic pressure of the flow C acts most far from the axis of rotation and thus enabling the most efficient transfer of kinetic energy of the lower high speeded jet flow to the assembly 30.

As the assembly 30 revolves further in the direction J, the lowermost member 34 turns upward and reaches an operative position shown by an arrow 34D in FIG. 5 where approaches to a zone of converging of the lower and upper ambient flows at immediately behind the assembly 30, where the dynamic pressure of the jet flow on the member 34 which is in the operative position 34A decreases and vanishes and the deformed member 37 continues to force the member 34 to pivot against the decreasing dynamic pressure of the flow C into a transient operative position shown by an arrow 34D in FIG. 5 and to force the body 31 to rotate in relation to the member 34 in the position 34D. Then the lower and upper ambient flows become to run into the main flow A in the direction B and the dynamic pressure of the flow C vanishes and the member 37 turns the member 34 from the position 34D in a direction shown by an arrow N in FIG. 5 about the axis of the hinge 35 toward the position 34B and becomes free and then the own weight of the member 34 and resistance of the upper ambient flow pivot down the member 34 and the member 37 about the axis of the hinge 35 further into the position 34B and up to a limit 39" so that the flow reception compartment between the body 31 and the member 34 vanishes, the surface 34b becomes to be oriented along the direction K of the upper flow and a little or no retarding moment is created by the counter upper flow about the axis of rotation of the assembly 30 thus enabling a minimum of transfer of water energy of the upper flow to the rotating assembly 30.

Another embodiment of the invention is a tangential hydro-turbine unit O for receiving the kinetic energy of a water flow A, preferably a river or a sea current that adapted to submerge in the flow A and composed of a turbine runner assembly 50 and a turbine shroud assembly 51 capturing the assembly 50 comprising of a set or a plurality of parallel and radial blade or paddle members 52 generally arranged on a periphery of a turbine hub body 53 for rotation about a generally horizontal axis, the axis being across a direction shown by an arrow B in FIG. 7. The body 53 extends along the axis and serves to support and guide the members 52 during their rotation in the direction B and comprises a co-axially disposed, circular cylindrical shell wall 54, circular disk-shaped inner walls 55 and opposite output shafts 56 fixed on the walls 55 in general transversal alignment with the direction B. The wall 54 and the walls 55 define opposite pockets or recesses 57 for accommodating opposite support compartments of the shroud 51 containing a well-known means for conversion of kinetic energy into any useable energy, which are described more fully hereinafter, and a plurality of air compressor cylinders 58 and a closed ballast hold 59 capable to be filled with ballast materials such as sand mixed with a known thixotropic clay mud or puddle and provided with a well-known, remotely controlled vibrator means (not shown).

As shown better in FIG. 7, the shroud assembly 51 is disposed above and around of the members 52 and takes the form of an open-bottom balloon or caisson capturing the assembly 50 and serves to hang the unit O and facilitate the rotation of the assembly 50 in the flow A. This assembly 51 comprises a shroud 60 conveniently fabricated from sheet metal such as steel and duralumin or fiberglass or from an arched strong framework and a cloth covering and has a calotte-shaped cross-section and composed of opposite side walls 61 adjoined between by a curved roof 62, a front wall 63 for facing the oncoming flow A and a rear wall 64. The wall 63 has a lower edge on a horizontal plane containing an upper portion of a lowermost member 52, the wall 64 has a lower edge on the plane and proximate to a point of water discharge from the unit 50. The front, side and rear walls 61, 63 and 64 configure an interior room 65 of the assembly 51 for accommodation of the assembly 50.

The opposite ends of the members 52 are closely positioned against inside faces of the walls 61, the outer edges of the members 52 are closely positioned against inside facial surfaces of the roof 62 such that a minimal clearance between the members 52 and the shroud 60 is maintained.

The walls 61 project below the lower portion of the assembly 50 and have lower edges on a horizontal plane containing an outer edge of a lowermost member 52. The roof 62 is of semi-circular configuration with an internal radius of curvature approximating to the external radius of curvature of the assembly 50. The distance between the walls 61 which partly defines the room 65, is somewhat greater than the length of the assembly 50.

In operation, the assembly 51 separates the flow A into an upper ambient flow in a direction shown by an arrow K in FIG. 7 immediately above the roof 62 and a lower ambient flow shown by an arrow C in FIG. 7 which runs as a fluid jet at increased speed immediately under the edges of the walls 63 and 64 and between the lower portions of the walls 61 in the direction B and dynamically presses onto lowermost members 52. In known manner, these members 52 are submerged in and positioned across the jet flow C and urged by the jet flow C in the direction B and receive the kinetic energy of the jet flow C while it accelerates as is sucked into a low pressure zone created immediately behind the unit O by its abrupt ending and the flow A that is believed to assist in producing a high efficiency design of the unit O. The rotation of the body 53 moves the members 52 continuously, alternately and in turn between a lower operative position located across the jet C where the pressure is transferred continuously from the members 52 to the body 53 which rotates with the members 52 about the axis in the direction B, and an upper inoperative position within the room 65 which being ocupied with air and in which relatively less or no dynamic air pressure is transferred to the assembly 50, therefore keeping relatively less or no friction loss of transferring kinetic energy.

As shown in FIG. 7, elongate, horizontally extending between the lower portions of the walls 61, receiving energy-controlling front and rear apron members 66 are pivotally supported on the lower edges of the walls 63 and 64 by means of piano lugs and pin hinges 67 to pivot in opposite directions shown by arrows P and Q in FIG. 7 and serve to control the dynamic pression of the jet C on the lowermost members 52. The apron members 66 are floatable on a surface of the water jet C and have their centers of gravity which are located remotely from an axis of the hinge 67. The small end gaps between the ends of the members 66 and the walls 61 are sealed with a resilient packing 68 provided on the outer ends of the members 66 and which engage on the inner surfaces of the walls 61.

A well-known, receiving energy-controlling, modular, preferably electrical-driven, air compressor (not shown) is provided within the compartment 69, for example, and connected with a number of connection pipes and valves (not shown) to the tanks 58 and the room 65 and being capable of filling the room 65 with air from the tanks 58 to keep a surface of the jet C in an operative position on a plane containing the lower ends of the walls 63 and 64 and an upper portion of an lowermost member 52 or to displace the water surface within the room 65 down and to permit the members 66 to pivot down by its own weight about the axis of the hinge 67 from a vertical position follow the water surface into a vertical position where lower edges of the members 66 will be immediately below to stop the receiving of the energy of the jet C and rotation of the assembly 50 and to increase a lift force of the assembly 51 in the flow A to facilitate the emersion of the unit O toward the surface of the flow A, or removing the air from the room 65 into the tanks 58 to allow the water to come from the jet C upward into and fill up the room 65 to brake rotation of the members 52 for stopping the assembly 50 and breaking the receiving of the kinetic energy of the jet C.

For controlling the kinetic energy being receiving by the assembly 50, the air is displaced by the controlling compressor means into or from the room 65 so that the compressed air urges the surface of the jet C to move in an intended vertical direction in relation to a radial width of a lowermost member 52 and cause decreasing or increasing correspondingly the pressure of the jet C onto lowermost members 52.

Support compartments 69 are provided on inside facial surfaces of the walls 61 for accommodating a well-known means for conversion of the kinetic energy of the shafts 56 when being rotated into any usable energy which are described more fully hereinafter. The entire assembly 50 is in contact and supported by the shroud 60 with a well-known, appropriate bearing means 70 supporting the shafts 56 for relative rotation.

The connecting means for the unit O when which being heavier-than-water that comprises a plurality of length of tether members 71 such as chain or rope which extending horizontally and oppositely from axially spaced ring-bolts 72 secured on a top of the roof 62. The connecting means for the unit O when which being lighter-than-water that comprises a plurality, two for example, spaced length of anchor chain tether members 73 each having an upper tether end attached to ring-bolt 74 fixed outwardly on the lower portion of the wall 63, The units D, H, I and O may be conveniently fabricated from metal such as steel and duralumin or fiberglass.

A choice of an appropriate means for converting kinetic energy of the turbine units D, H, I and O according to the invention into useful energy depends on local demand in energy and conditions of installation of the apparatus. An energy generator may be built-in the units or located in a surface vessel above the flow A. There are the well-know generators such as a modular electricity generator having a generator stator part and a generator rotor part and (or) a positive displacement fluid pump having a plurality of opposed pump cylinders and corresponding pump pistons or diaphragms connected to a pump crankshaft with means for varying the stroke of the pistons or diaphragms within the cylinders, and speed increasers which may be connected between to the hub members 6 and 12 of the unit D, the hub member 12 and the shafts 27 of the unit H, the hub body 31 and the axle members 32 of the unit I, the shafts 56 and the compartments 69 of the unit O and to a number of energy-transferring conduits (not shown) extending to an user of the conversed energy.

It is possible for the apparatus the energy which is produced by the generator that may be carried away by means of cables and fed directly into the energy network or may be is supplied to, for example, sea water desalting plants and to desalted water pump stations.

In receiving and conversing kinetic energy from the flow A by the use of the unit D, H, 1 or O constructed described above, firstly the unit D, H, I or O is assembled nearly to a place of working. The units D, H, I or O can have intended buoyancy because the tank 9, 42 or 59 can be filled with air or the ballast material and provided with a number of plummets so that an intended condition of equilibrium of the unit D, H, I or O in relation to the water body A occurs. The tanks 9, 42 and 59 can be filled with air and the plummet can be taken off when transporting the unit D, H, I or O to the position of installation. A ship such as a towboat can transport the unit D, H, I or O in a floating condition. As soon as the unit D, H, I or O has reached its intended position of installation the tank 9, 42 or 59 according to the requirements involved, is provided with the ballast plummets and thixotropic mud material such as a clay puddle or mud filler mixed with sand for securing the intended negative buoyancy or inundation of the unit D, H, I or O in the water. The thixotropic mud materials are capable of being flowable to be inserted into the tank and a short time later to become hardened for securing less or no friction resistance to rotation of the assembly 1, 19, 30 or 50 and then again to be liquidized in the tank by means of the vibrator means and become flowable for displacing from the tank away by means of, for example, air being pressured into the tank to secure floating of the unit when it needs to be repaired or transported by float-on way. The unit D, H, I or O can slowly sink to the ground bottom or floor of the flow A into an operative position where the bearing arrangement of the unit D, H, I or O only has to still carry the thrust of the flowing water. Then the unit D, H, I or O being maintained in the operative position by aid of the members 4, 20 and 21, 44, 72 and 73 and a well-known means of connections such as an anchor chain or rope extending from the unit D, H, I or O and being secured with its far ends to appropriate objects such as anchors, holdfasts or posts which being located aside and upstream of the unit D, H, I or O and engaged with the ground of a bottom or opposite river banks or belt shores and capable of supporting the member 4, 20 and 21, 44, 72 and 73 and the unit D, H, I or O in the flow A. In another well-known way of anchoring (not shown) the unit D, H, I or O can be attached to one or two surface vessels connected from upstream by an anchoring rope to any anchor.

To maximize the energy which being converted, a multiplicity of the units D, H, I or O that can be disposed in the string order and attached individually or in group to chain or rope tethers extending from the unit D, H, I or O in a direction crossing the direction B of the flow A, for example between river banks or belt shores, or in a direction opposite the direction B to anchors being secured on a bottom or floor of the flow A.

Method of using of the apparatus according to the invention that is depended from a power output of the apparatus. In the most effective case of installation across the narrowest portion of a marine current, the apparatus may be installed below, for example, 20 m of a navigable marine waterway and where a depth of the water body is equal to between 40 and 100 m and the current speed is not less than, for example, 1.0 m/s and a diameter of the turbine unit D, H, I or O can be equal to, for example, between 10 and 80 m so that the power output of the apparatus between 120 KW and 3 MW is possible. The natural speed in the marine currents can achieved up to 2.5 m/s and in the unit D, H, I or O can achieved up to 5 m/s, while the amount of output power rises with the third power in relation thereto.

Perspective areas for installations of the apparatus according to the invention are, for example of Australia, in narrow and deep rifts between Islands of Thurthday and Prince of Wales within Torres Strait, and between Flinders and Cape Barren Islands of Furneaux Group within Bass Strait, et al., there it is possible to install a plurality of such apparatuses according to the invention of a diameter up to 100 m having a sum power output of thousand of MW.

Figure 9:
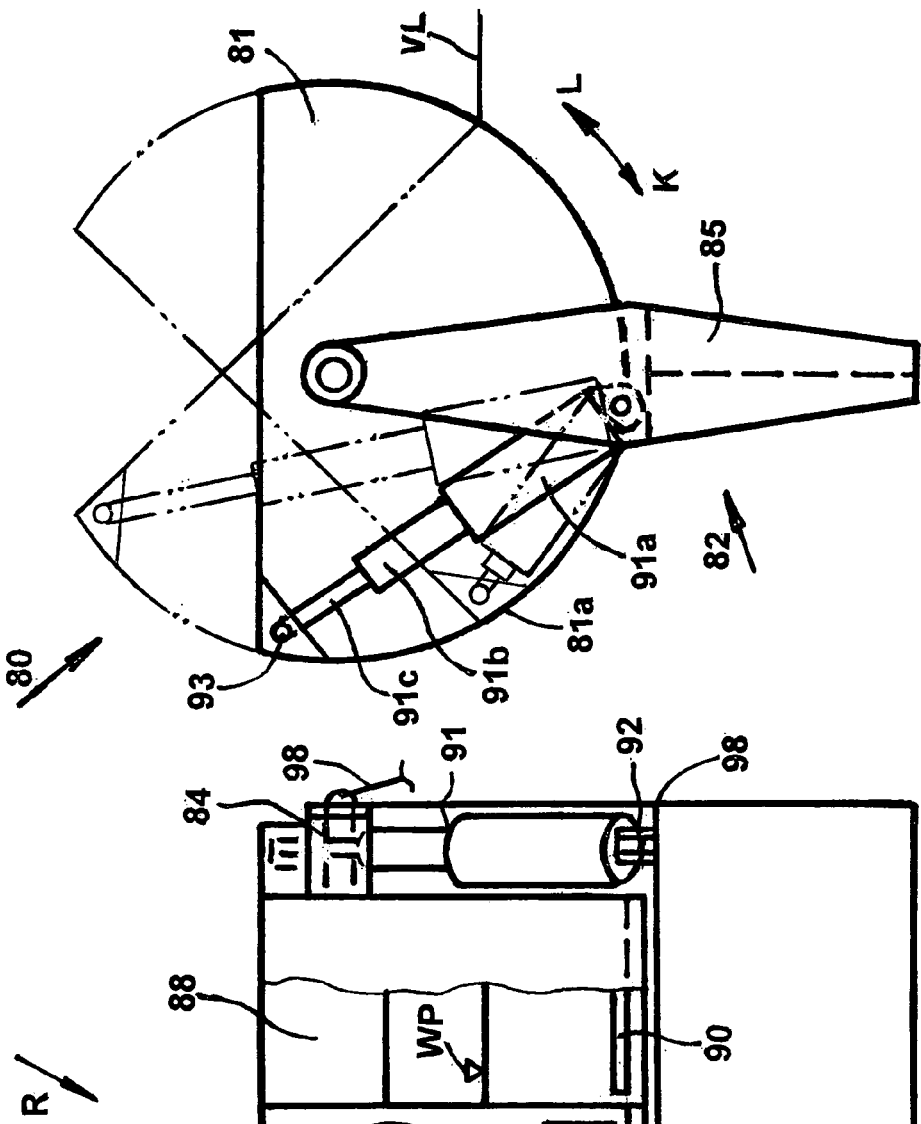
FIG. 9 is a side view of the vessel shown in FIG. 8.
Figure 8:
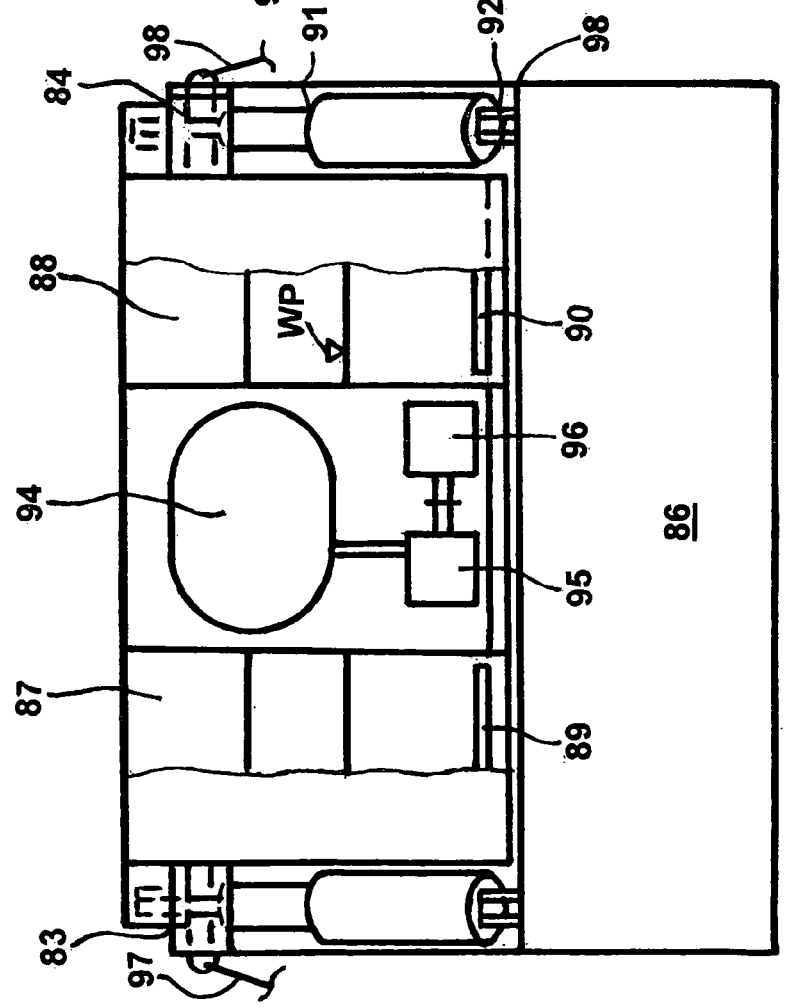
FIG. 8 is a front view of a first embodiment of a kinetic wave induced energy-receiving and transferring vessel of the apparatus according to the invention.

A preferable embodiment R of an apparatus according to the invention for receiving kinetic energy of surface water waves and transforming this energy into useable energy, the embodiment R comprises a floatable on surface of a water basin A such an ocean or a sea or a great lake, barge or ship or vessel and the like 80 as shown on FIGS. 8 and 9 that comprising a vessel hull capable of facing waves of the basin A and moving like rocking, pitching and rolling about a determined central point of the rocking motion, for example, a circular cylindrical hull 81 capable of rolling about its generally horizontal, central longitudinal axis, the rolling axis being on a vertical, central longitudinal plane of the hull 81 and can be transversal to a direction of advancement of the waves. The dashed lines on FIG. 9 indicate ultimate permissible operative positions of the hull 81 while it is rolling when heavy weather loads exist.

In a first embodiment, an U-shaped, submersible stabilizer frame 82 is rotatably about the rolling axis affixed at its upper ends with a co-axial bearing means such axles 83 and 84 and a clearance on side ends of the hull 81. Only one common axle could of course be utilized, depending on the design of the vessel 80. The frame 82 has an axially and radially downward extending opposite rib or shelf members 85 and a paddle-shaped member 86 extending between the members 83 and below a water line shown as VL in FIG. 9 and preferably a bottom 81a of the hull 81 and having vertically intended surface areas for pressing up onto motionless adjacent water of the basin A in opposite directions shown by arrows K and L in FIG. 9 and remote from the axis. The shape of the frame 82 in vertical projection, i.e. its contour, can be adapted to the pertinent conditions for the vessel 80 in question, and will preferably have a rectangular shape and a depth of its immersion can be adapted to follow the bottom 81a, such that the depth of immersing is acceptable, and its intended radial width can be selected according to a total mass of the hull 81 and is determined by trials. More than two members 85 and one member 86 could of course be utilized, depending on the requirements. Better stabilization of the frame 82 can be obtained as the members 85 and 86 are arranged such that they extend out beyond a determined wave zone.

Advantageously, the hull 81 can be provided with controllable ballast media. The ballast media can be contained in a number of facilities, for example, opposite holds 87 and 88 for containing a ballast sand of an intended constant mass and a ballast water which being spreaded within a volume of the ballast sand and capable of being changed in the mass, preferably from the basin A. A well-known energized bilge pumping equipment (not shown) is provided, preferably on the vessel 80 for effecting a change of the mass of the ballast water, that having injection and drainage pipes 89 and 90 for feeding an intended mass of the water into the ballast sand which being in the holds 87 and 88 and for removing an intended mass of the ballast water out of the holds 87 and 88. Each hold 87 and 88 can be provided with a well-known device (not shown) for measuring a position of a controllable ballast water plane indicated on the drawing by the line WP. The vessel 80 is provided with a well-known means for measuring a frequency of the rolling motion of the ballasted hull 81 and determining when to operate an activating means of the bilge pumping equipment to effect tuning of the rocking system into resonance of the wave induced rocking motion to increase the intended generation of the energy or into a dissonance of the rocking motion to increase the intended damping or restraint of the unwanted rolling motion. Only one or more than two ballast holds could of course be utilized, depending on the requirements.

In operation, the injection and drainage ballast pump means is capable of injecting water A into the ballast sand which being in the holds 87 and 88 to increase the mass of the hull 81 or draining the watered ballast sand to decrease a mass of the ballast and a mass of the ballasted hull 81 and to displace the gravity center of the hull 81 in relation to the axis from its position into an intended position which corresponding to the intended pendulum characteristics of the rolling hull 81. Whereby operating the ballast pump means moves the ballast water in relation to the sand in the holds 87 and 88 in the intended sense, which movement of the ballast water changes correspondingly the mass and the frequency of the own pendulum oscillation of the hull 81 about the axis into the resonance with the rolling oscillation which being forced by the waves, thereby the amplitude of the rolling motion of the hull 81 is increased up to maximal permissible amplitude and the receiving kinetic power will achieve a maximum.

A known means for transferring kinetic energy of the rocking hull 81 into an useable energy such as potential energy of compressed air and electricity can be used on the vessel 80. Each of a number, four preferably, of double-acting, pistons and cylinders brake-pump units 91 has its disposed telescopically cylinders 91a and 91b pivotally secured via a linkage or bracket pivot connection 92 at a lower end to the frame 82 and by its piston rod 91c pivotally connected via a linkage or a bracket pivot connection 93 to the hull 81 and is capable of compressing air or air and water, preferably water A into a into a pressure tank 94 through input pipes and well-known controlling one way check valves (not shown) to ends of interiors of the cylinders 91a and 91b and by an output pipe and a well-known controlling relief valve (not shown) to a well-known hydro-turbine 95, which has an output shaft and is combined with an electricity generator 96 having a generator stator fixed on the hull 81 and a generator rotor having an input shaft coupled via a well-known speed increaser such as a gear box (not shown) to the turbine shaft.

Each of the members 84 has tangentially oriented, in relation to the axis, hull 81 rolling motion-damping face portions capable of forcing the motionless water A in the directions K and L for being also motionless and capable of supporting the cylinder 91a against piston cylinder 91b while the piston rod 91c is capable of being displaced in relation to the cylinders 91a and 91b with the hull body 81 when it being rolled. The face portions of the member 84 are operable by the waves and pressure of the fluid in the cylinders 91a and 91b to damp out movement of the piston rod 91c because rolling motion of the hull 81 to effect damping and restraint of the rolling motion.

The vessel 80 is provided with at least two elongate tethers 97 and 98 such as lengths of anchor chains, each of the chains having an upper chain end which being attached to a side end of the frame 82 and a lower chain end which being attached to an anchor capable of engaging to a water basin bottom or a sea platform (not shown).

For the purpose of description of the operation of the vessel 80, it will be assumed, that the hull 81 is placed on the waving surface of the rough water basin A and the paddle member 86 is submerged in the water basin A to operate. The hull 81 is being rolled by means of the waves alternately in the leftward and rightward lateral directions K and L about the rolling axis. Whereby the hull driven end of the piston rod 91c moves with the hull 81 about the rolling axis and the frame stopped end of the cylinder 91a remains motionless, a relative movement being produced between the supported end 92 of the cylinder 91a and the supported end 93 of the piston rod 91c. This relative movement causes a relative movement between the rod 91c and the cylinders 91b and 91a to produce an amplified oscillating motion of the rod 91c in relation to the piston cylinder 91b and a relative oscillating motion between the piston cylinder 91b and the cylinder 91a. Thereby air or air and water of the basin A will be alternately sucked into and compressed in the cylinders 91a and 91b and displaced from the cylinders 91a and 91b through the pressure pipes and valves into the tank 94 for accumulating and storing potential energy of the compressed air. Then the compressed fluid, preferably water can be fed from the tank 94 through the pressure pipe and the controlling relief valve into the turbine 95 to rotate the turbine rotor and a generator rotor in relation to a generator stator of the generator 96 and electricity energy will generate.

Figure 11:
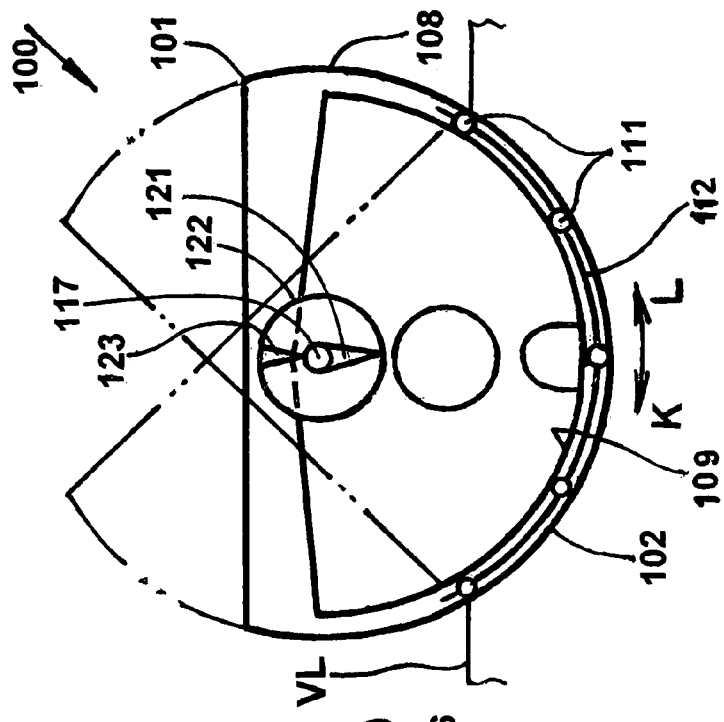
FIG. 11 is a side view of the vessel shown in FIG. 10.
Figure 10:
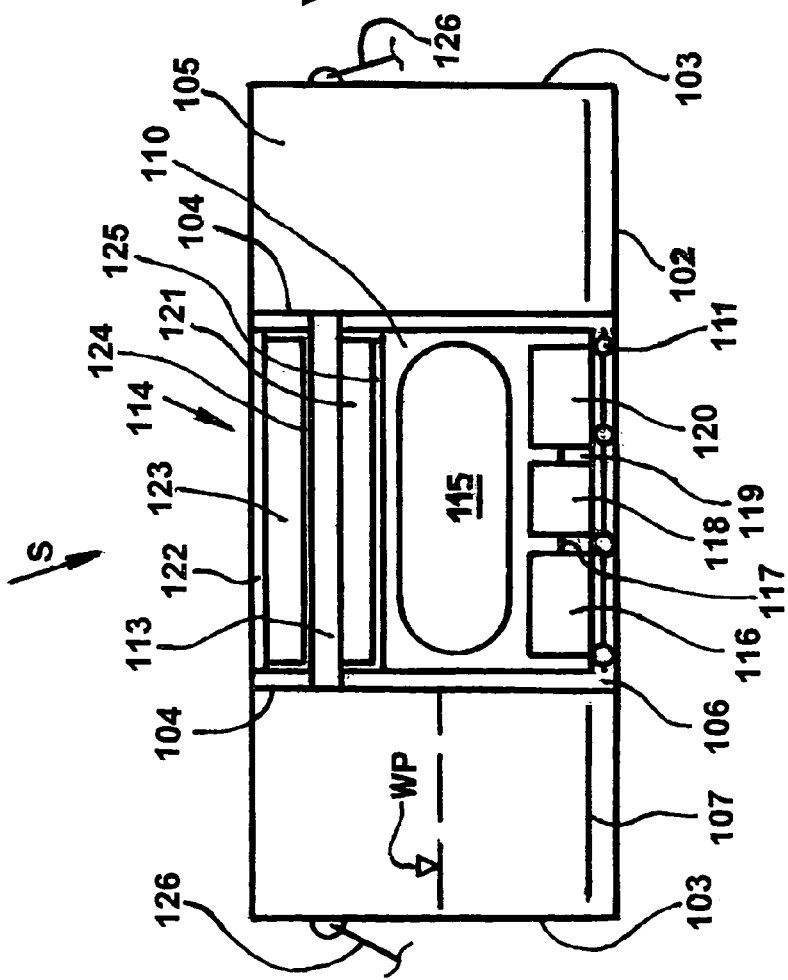
FIG. 10 is a front view of a second embodiment of a kinetic wave induced energy-receiving and transferring vessel of the apparatus according to the invention.

A second preferable embodiment S of an apparatus according to the invention for restraint a rocking, pitching and rolling motion or for receiving kinetic energy of surface water waves and transforming this energy into any useable energy, the second embodiment S comprises a floatable on surface of the water basin A barge or ship or vessel 100 as shown on FIGS. 10 and 11 that having a vessel hull capable of facing surface waves of the basin A and rocking about its central rocking point and, for example, a circular cylindrical vessel hull 101 capable of especially rolling about a determined, generally horizontal axis, the axis being preferably on a central vertical plane of the hull 101 and crossing a direction of advancement of the waves. The dashed lines on FIG. 11 indicate ultimate permissible operative positions of the hull 101 while it is rolling when there is a heavy load of the waves.

The hull 101 has a circular cylindrical bottom and side boards 102, end walls 103 and inner walls 104 which form opposite end holds 105 and a middle hold 106. More than one middle hold 106 or more than two holds 105 could of course be utilized, depending on the requirements.

Advantageously, the holds 105 can be provided with any controllable ballast media. The ballast media includes preferably an intended constant mass of a ballast material having a plurality of through pores of intended sizes, such as sand and an intended controllable liquid mass such as water, preferably water from the basin A, which can be spreaded within the ballast sand. A well-known energized bilge pumping equipment (not shown) is provided on the vessel 100 that having injection and drainage pipes 107 for feeding the intended mass of the water into the ballast sand which being in the holds 105 and for removing intended masses of the ballast water out of the holds 105. The vessel 100 has a well-known means such as a tank-level gage for measuring a mass of the ballast water having a level shown as WP in FIG. 10 and a stop-watch (not shown) for measuring a frequency of its rocking motion and determining when to operate an activating means of the bilge pumping equipment as shown at 107 to effect further changing of an amplitude of the rocking motion toward resonance with the waves for increasing the production of the energy or toward dissonance with the waves to increase damping and restraint of the rolling motion.

The hold 106 is adapted to accommodate a stabilizer frame means 108 comprising a co-axial, semicircular cylindrical bottom 109 and side walls 110 and rotatably and resistance-free affixed on the hull 101 by a plurality of co-axial, in relation to the axis, balls or rolls or wheels 111 guided by a retainer member 112 and rolling on the bottoms 102 and 109 or rails so that the frame 108 is isolated from a rocking, especially rolling motion of the hull 101. Any other well-know supporting means for the frame 108 may be used such as a fluid-cushion support.

The bottom 109 and the side walls 110 form a room for mounting a shaft 113 supported movingly and co-axially from the walls 104 therebetween, where two co-axial shafts could of course be utilized instead of the shaft 113 and more than one holds 106 may be arranged in the hull 101 depending on the design of the ship 100; a fluid pump-motor means 114 connected with a pressure conduit and through a controllable check valve which open only under an intended pressure to a pressure tank 115 for containing a compressed fluid such as air or air and water and accumulating the potential energy and with a pressure conduit and through a well-known controllable pressure-relief valve (not shown) which open only under an intended pressure to a fluid turbine 116 connected with its shaft 117 via a well-known speed increaser such as gear box 118 and a shaft 119 to an electricity generator 120.

A many well-known means 114 for transforming kinetic energy of the rocking hull 101 into any useable energy such as potential energy of compressed air and electricity can be used on the vessel 100. For example, an air- or water-compressing, potential energy generator and rocking motion-damping and constraint vane pump 114 comprises the shaft 113 provided with an elongate, radially disposed paddle piston 121, a co-axially disposed cylinder 122 secured at its ends to the walls 112 therein and provided with an radially disposed, elongate paddle piston 123; resilient packings 124 and 125 provided on the outer edges of the pistons 121 and 123 and engaged correspondingly on an outer is surface of the shaft 113 and on an inner surface of the cylinder 122 for sealing the small gaps between the piston 123 and the shaft 113 and the cylinder 122 and between the piston 121 and the cylinder 122; an input pipe and a well-known, one-way check valve (not shown) that is closed to pressured fluid from the cylinder 122 but is open by suction produced by return strokes of the piston 123 that connect the operative compression side of the pump 114 to atmosphere and the water basin A.

The piston 123 is capable of being forced by the rocking hull 101 via the shaft 113 into interaction with the fluid which being in the cylinder 122 between the pistons 121 and 123 to compress the fluid and urge the fluid at the intended pressure through the pressure conduit and the tuned check valve which open only under the intended pressure to supply the pressured fluid into the tank 115. The pressured tank 115 can supply the pressured fluid with the output pressure conduit and through the tuned pressure-relief valve to the turbine 116 that drives via its power shaft 117, the speed increaser 118 and the shaft 119 the generator 120.

The ship 100 is provided with at least two opposite disposed stopper means 126 comprising elongate tethers such as lengths of anchor chains, each of the chains having an upper chain end which being attached to the wall 103 closely to the axis and a lower chain end which being attached to an anchor capable of engaging to the water basin bottom or an motionless object such as a sea platform (not shown).

For the purpose of description of the operation of the ship 100, it will be assumed, that the vessel 100 is placed on the waving surface of the rough water basin A to begin the operation and is maintained by the tethers 126 in an operative position along the waves. The hull 101 is then being rolled by the waves about the axis alternately in leftward and rightward lateral directions shown by the arrows K and L in FIG. 11.

In operation, the injection and drainage ballast pump of the bilge pumping equipment injects basin water A into the ballast sand which being in the holds 105 to increase the mass of the vessel 100 or removes the ballast water to decrease the mass of the vessel 100 and to displace the gravity center of the vessel 10 in relation to the axis from its position into an intended position which services to increase the kinetic energy of the rocking motion and the transformed power up to maximal permissible quantity or to decrease and restraint the unwanted rolling motion.

Whereby the hull 101 driven piston 121 rotates about the axis while the motionless frame 108 supported piston 123 being motionless in relation to the axis, thereby the piston 121 will move about the axis in relation to the piston 123 and a fresh fluid such as air or water of the basin A will be alternately sucked into and compressed in the cylinder 122 and the compressed fluid will be displaced from the cylinder 122 with the inlet pressure conduit and through the check valve into the tank 115 where its potential energy will be accumulated. Then the compressed fluid can be fed from the tank 115 with the outlet pressure conduit and the pressure-relief valve into the turbine 116 to rotate the turbine shaft 117, the rotation will be increased by the speed increaser 118 to rotate the shaft 119 of the generator 120 and electricity energy will generate.

These kinds of useable energy may be generated with using new and old ships, vessels, boats, pontoons etc. This method is distinguished from the well-known methods, based on the utilization of wave motion for a ship propulsion with a foil-type wave propulsion system, and providing conversion of an energy of hull's rocking, pitching and heaving, or rolling motion into movement of energy-generating part of an useable energy generator. The following categories of issues can use the rocking-driven energy to generator technology: powering supply of sea oil platform, oceanographic researches, disaster coastal areas, desalinization plants, watering of coastal areas, etc.

The above-mentioned embodiments of the invention can be versatile, cheap to manufacture, low in maintenance requirements, highly reliable and requiring a low degree of skill for installation, servicing and operation.

We claim as our invention:

1. An apparatus for converting kinetic energy of a fluid flow in a fluid basin into any usable energy, the apparatus comprising a tandem axial fluid turbine unit adapted to submerge and capable of being maintained in a path of the main flow and comprising:
   a relatively widened, rotatable front axial turbine runner assembly capable of facing, directing and speeding an oncoming part of the main flow and comprising:
      a plurality of front turbine blade members for receiving energy of the oncoming flow,
      a funnel-shaped member supporting and guiding the front blade members and capable of being forced into interaction with the oncoming flow to urge the oncoming flow in converging radial directions and to urge a portion of the main flow that is located immediately downstream of the funnel member in a contrary direction toward the funnel member and having:
      a front edge for facing the oncoming fluid flow,
      a confuser portion extending from the front edge along the axis and decreasing in a transversal dimension for forcing the oncoming flow and the adjacent downstream flow in converging radial directions, where the confuser portion is operable to move, accelerate and direct the oncoming fluid flow and to form a relatively low pressure zone in the flow immediately adjacent to and downstream of the unit, the zone sucks and further accelerates the oncoming flow in relation to the blade members of the front and rear runner assemblies by means of dynamic pressure of the main flow capable of forcing the oncoming flow against the confuser portion and from the ring portion, and
      a rear ring portion that having an edge opening proximate to a point of fluid discharge from the unit and operable to further accelerate the flow in the axial direction by the sucking pressure in the lower pressure zone that is capable of forcing the flow oncoming from the confuser portion in the axial direction; where
   the plurality of front blade members are spaced inside and around and along and fixedly mounted with their outer edges on an inner surface of the confuser portion, each front blade member is extending radially toward the axis and from a leading and trailing blade edge facing the oncoming flow thereof and being located at the front edge of the confuser portion toward an end blade edge located on a plane, the plane being perpendicular to the axis and between the confuser portion and the ring portion, in a direction diverging from the central longitudinal planes of the confuser portion and being opposite an intended direction of rotation of the front runner assembly, and progressively decreasing in a radial dimension from the leading and trailing end to the end blade edge thereof,
   whereby directing channels are defined by the confuser portion and the adjacent front blade members extending along and between respective front blade members in converging screw directions about and along the axis so that when the oncoming fluid flows within the front runner assembly, the front runner assembly forms an accelerating screw fluid flow about and along the axis in the diverging directions, thereby the front runner assembly rotates in the opposite intended direction; and
   a relatively narrowed, rotatable rear axial turbine runner assembly disposed co-axially in relation to the axis and comprising:
      a hub member extending along the axis;
      a plurality of rear turbine blade members spaced around and radially outward and fixedly mounted to a surface portion of the hub member and disposed with a clearance within the ring portion of the front runner assembly, each of the rear blade members having a surface portion diverged from the central longitudinal plane for facing transversally the accelerated screw flow oncoming from the front runner assembly, whereby the adjacent rear blade members, the hub member and the ring portion of the front runner assembly configure longitudinal channels diverging from the axial direction in a second direction opposite the first diverging direction and the accelerated and screwed flow within the ring portion is further accelerated in the axial direction by means of sucking into the lower pressure zone and rotates the rear runner assembly with the rear blade members in the intended direction opposite the direction of rotation of the front runner assembly;
   an axially disposed pin member supporting the front and rear runner assemblies for relative rotation and having a front end,
   a means for connecting the front pin end to stopper objects, where the main flow is moving relative to the stopper objects, capable of maintaining the unit in operative positions in the main flow.

2. The apparatus according to claim 1, wherein the confuser portion has the cone angle equal to about 30° to 40° and each of the front blade members is extending along a line diverging at an angle which increasing in the axial direction from about 30° to 45°, and having the radial dimension that being equal to about 25-30% of an inner diameter of the confuser portion.

3. The apparatus according to claim 1, wherein the front runner assembly comprises a co-axially disposed, conical-shaped, water-cleaning curtain lattice member fixedly mounted with its outer rear edge to and between and ahead of the front edge of the funnel member for retention of weeds and debris's carried by the oncoming fluid flow, and with an elongate, lattice-cleaning scraper member located immediately ahead of the lattice member and extending along the cone generatrix of the lattice member and supported rotatably about the axis on the pin member and having the center of gravity being located remotely from the axis and a cutting edge oriented in a direction opposite the direction of rotation of the lattice member thereby the scraper member can rotate in the direction of rotation of the lattice member thereby the scraper member can rotate in relation to the lattice member in the opposite direction and engage weed and debris delayed by the lattice member to effect their removing.

4. The apparatus according to claim 1, wherein the axial turbine unit further comprises a means for converting the kinetic energy of the front and rear runner assemblies into electricity, the converting means comprising:
   an electricity generator having first generator part connected to the funnel member and second generator part connected to the hub member for relative rotation by the fluid flow to effect generating of electricity,
   a shaft connecting the funnel member to the corresponding generator part, a shaft connecting the hub member to the other generator part, a means for increasing speeds of rotation of the parts, conduits for transferring electricity from the parts toward an user;

wherein the speed increasing means of the front runner assembly comprises:

a vertically disposed, spider-shaped frame for supporting the turbine unit, the frame having a plurality of radially extending consoles and openings therebetween, the horizontal consoles are connected to the stopper objects;

a backward oriented, relatively narrowed gear and support wheels supported rotatably on ends of the consoles;

a frontally and co-axially disposed, relatively widened, circular supporting and guiding rail- and driving gear wheel-shaped portion of the funnel member, the rail and gear portion being engaged with the support and gear wheels;

a number of radially, in relation to the axis, extending shafts supporting the support and gear wheels and being supported rotatably on the consoles, the number of relatively widened gear wheels supported on inner ends of the radial the number of relatively widened gear wheels supported on inner ends of the radial shafts and engaged with a relatively narrowed gear wheel supported on the shaft of the corresponding generator part.

5. The apparatus according to claim 1, wherein the front runner has at least one hollow and closed buoy tank extending in the funnel portion and capable to be filled with and emptied from air and ballast material and is maintained within the deep flowing water.

6. The apparatus according to claim 1, wherein the stopper object comprises an anchor means having an anchor body and a link member with first link end and second link end, the first link end being attached to the apparatus and the second link end being attached to an anchor.

* * * * *